April 11, 1967
N. O. ROSAEN
3,313,417
MOBILE FILTERS
Filed June 8, 1966
5 Sheets-Sheet 1
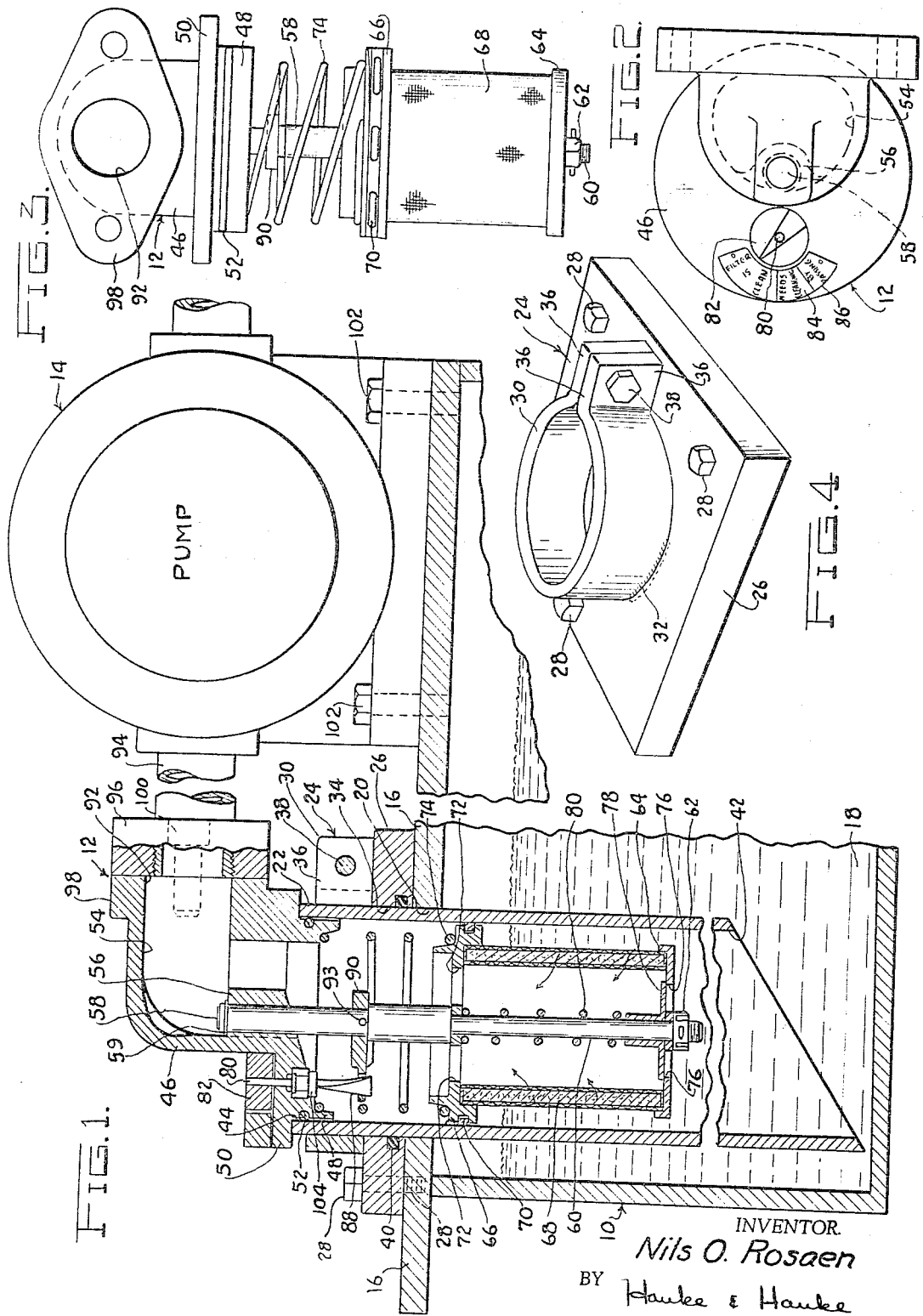
INVENTOR.
Nils O. Rosaen
BY Hauke & Hauke
ATTORNEYS INVENTOR.
NILS O. ROSAEN
BY Hauke & Hauke
ATTORNEYS

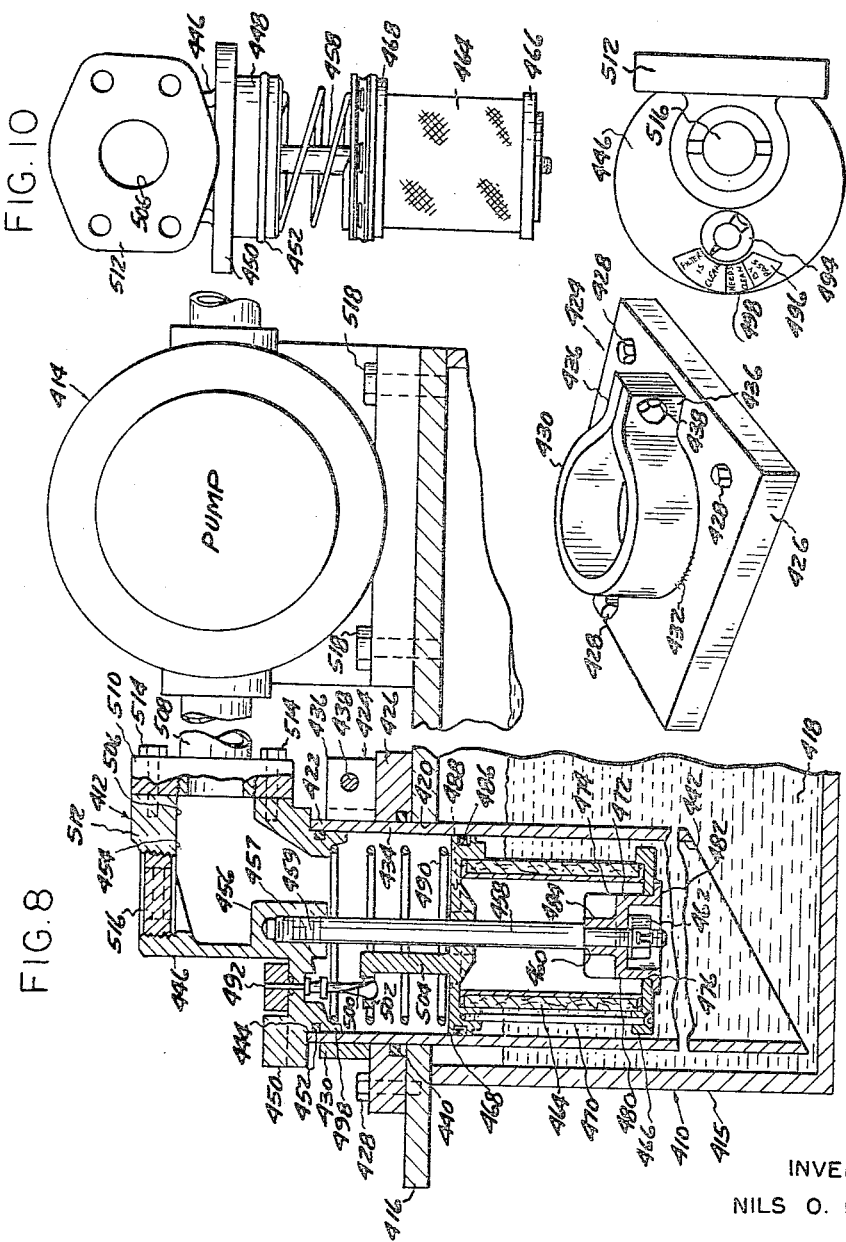

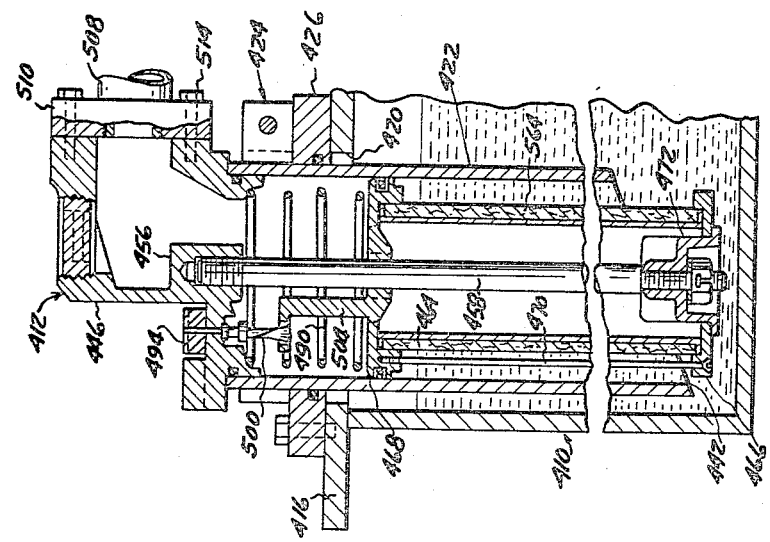
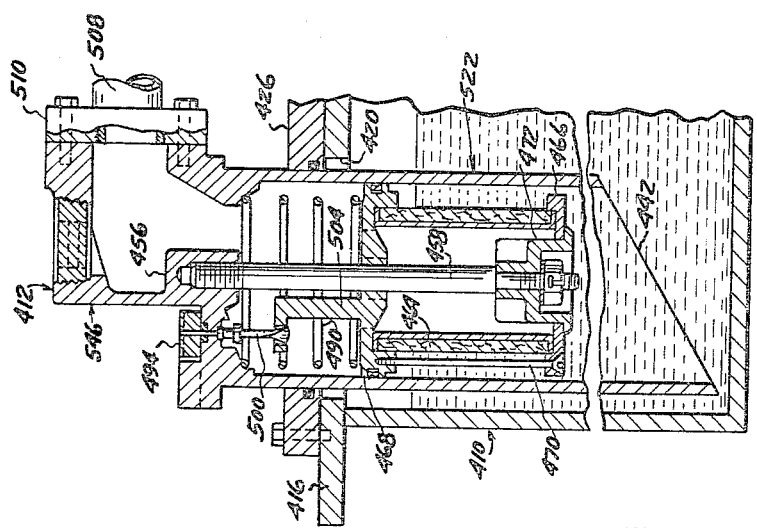
INVENTOR
NILS O. ROSAEN

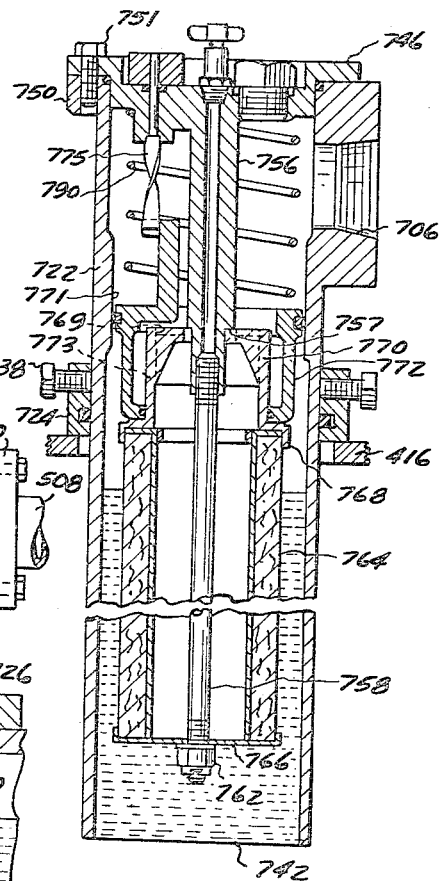
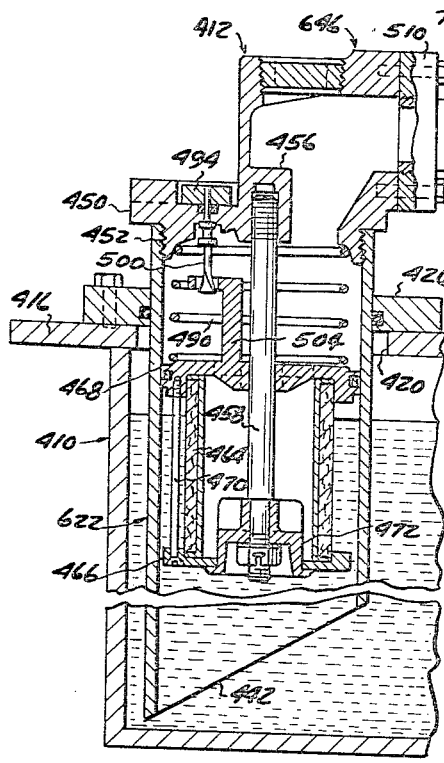

United States Patent Office 3,313,417
Patented Apr. 11, 1967

3,313,417
MOBILE FILTERS
Nils O. Rosaen, Bloomfield Hills, Mich., assignor to The Rosaen Filter Company, Hazel Park, Mich., a corporation of Michigan
Filed June 8, 1966, Ser. No. 562,417
13 Claims. (Cl. 210—90)

This application is a continuation-in-part of applicant's copending applications Ser. Nos 340,365 and 341,488, both filed on Jan. 27, 1964 and now abandoned, which in turn were continuations-in-part respectively of applications Ser. Nos. 279,930 and 279,935, both filed on May 13, 1963, and abandoned.

The present invention relates to fluid filter systems and more particularly to a mobile filter device adapted to be inserted into a reservoir for such a system and having means located exteriorly of the reservoir to indicate the condition of the filter element.

Filter devices which are adapted to be carried in a submerged position in the reservoir have been heretofore provided. The advantage of such a device is that expensive housing structure can be eliminated. However, filter elements in such devices are difficult to replace and it is difficult to provide means which indicate the condition of the filter element.

The present invention provides a filter device which is adapted to be carried in a position extending into a fluid reservoir. The housing structure which must be provided for filter devices positioned completely exteriorly of the reservoir has been replaced by an inexpensive tubular member. Since the filter device is positioned partially exteriorly of the reservoir, exteriorly located means have been provided to indicate the condition of the submerged filter element. Means have been provided to adjustably position the filter device with respect to the pump or other components of the system so that assembling and disassembly of the system has been readily facilitated.

It is an object of the present invention, therefore, to reduce the costs of producing fluid systems by providing a simply and economically produced mobile filter device adapted to be inserted in the reservoir for such system.

It is another object of the present invention to reduce maintenance costs for fluid systems by providing a mobile filter device adapted to be inserted in the reservoir of such systems and having means located exteriorly of the reservoir to indicate the condition of the filter element of the device.

It is yet another object of the present invention to facilitate assembly of filter systems by providing a filter device adapted to be carried in a position extending into the reservoir of such a system and having means for adjusting the position of the outlet of the filter device with respect to any other component of the system connected to the outlet.

It is still another object of the invention to improve the operation of fluid systems by providing a mobile fluid device adapted to be carried in a position extending into the reservoir of such systems and having bypass means operable to open a fluid path directly from the reservoir to the outlet of the device upon a predetermined pressure being produced across the filter element.

A further object of the invention is to simplify a fluid filtering system by providing an inexpensive tubular housing having a readily removable filter assembly carried therein.

Yet a further object of the invention is to simplify fluid system filtering by providing an inexpensive one or two piece housing having a readily removable filter assembly incorporating indicating and bypass functions and readily adapted for connection with a fluid reservoir and other system components.

Still further objects and advantages will readily occur to one skilled in the art to which the invention pertains upon reference to the following drawings in which like characters refer to like parts throughout the several views and in which:

FIG. 1 is a fragmentary view of a preferred fluid system of the present invention and in which the reservoir and a preferred filter device of the present invention are shown in section for purposes of clarity.

FIG. 2 is an elevational top view of the preferred filter device of the present invention as seen substantially from the top of FIG. 1.

FIG. 3 is an elevational side view of a portion of the preferred filter device of the present invention.

FIG. 4 is a perspective view of a preferred adjustable clamping means of the filter device of the present invention.

FIG. 8 is a fragmentary view of a preferred fluid system of the present invention and in which the reservoir and a preferred filter device of the present invention are shown in section for purposes of clarity.

FIG. 9 is an elevational side view of a portion of the preferred filter device of the present invention.

FIG. 10 is an elevational top view of the preferred filter device of the present invention.

FIG. 11 is a perspective view of a preferred adjustable clamping member of the filter device of the present invention.

FIG. 12 is a view like FIG. 1 but illustrating another embodiment of the invention.

FIG. 13 is another view like FIG. 1 but showing a further embodiment of the invention.

FIG. 14 is yet another view like FIG. 1 but illustrating still a further embodiment of the invention, and FIG. 15 is a cross-sectional view of another embodiment of the invention.

Figure 5:
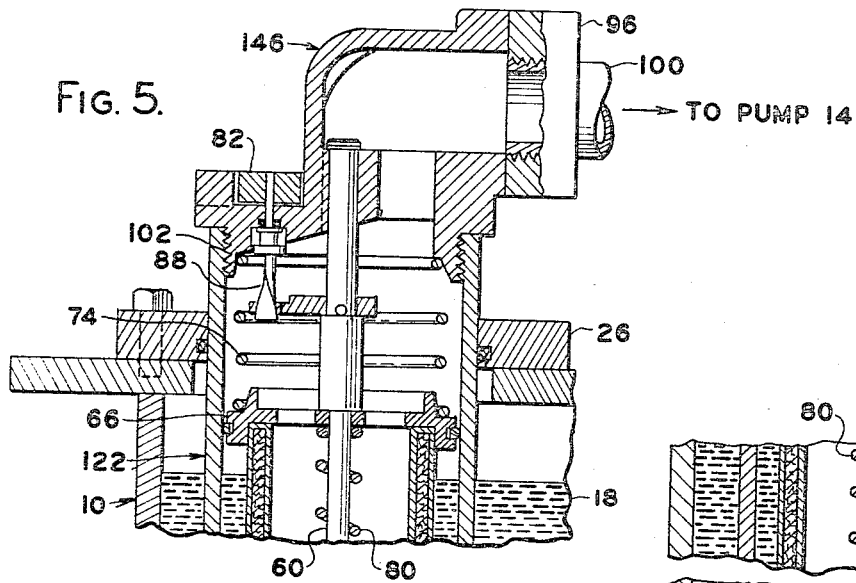
FIG. 5 is a fragmentary cross-sectional view illustrating another preferred embodiment of the invention.

Now referring to the drawings for a more detailed description of the prresent invention, a preferred fluid system is illustrated in FIG. 1 as comprising a fluid reservoir 10, a filter device 12 and a fluid pump 14.

The fluid reservoir 10 preferably comprises a top plate 16 and is shown as being partially filled with a suitable fluid 18. An opening 20 is provided in the plate 16.

The filter device 12 preferably includes a tubular housing member 22 which extends axially through the opening 20 as shown. A preferred clamping member 24 for securing the tubular member 22 to the plate 16 is shown in perspective in FIG. 4 as preferably comprising a base plate 26 preferably by welding 32 and is in axial alignment with an opening 34 provided in the base plate 26. Adjacent arm portions 36 are provided in the clamp 30 and a bolt 38 is provided through the arm portions 36. The tubular member 22 extends axially through the clamp 30 and the opening 34. The welding 32 is preferably provided at spaced portions of the juncture of the clamp 30 and the base plate 26 as indicated in FIG. 4 so that tightening the bolt 38 securely clamps the tubular member 22 in position. An annular seal 40 is provided in the base plate 26 to prevent fluid splash or spilling or vapor leakage past the opening 34.

The tubular member 22 is preferably positioned by the clamping member 24 such that an open inlet end 42 is disposed below the level of the fluid 18 and an opposite open end 44 is disposed exteriorly of the reservoir 10.

The filter device 12 as can best be seen in FIGS. 1 and 3, preferably further comprises a support housing structure 46 having an axially extending flange portion 48 which extends axially inwardly into the tubular member 22. A radially extending flange 50 provides seating engagement between the end 44 of the tubular member 22 and the housing structure 46. An O-ring seal 52 prevents fluid leakage along the flange portion 48.

The housing structure 46 is provided with an outlet chamber 54. As can best be seen in FIGS. 1–2, a boss portion 56 extends into the outlet chamber 54 in position to axially slidably carry a rod 58 in substantial axial alignment with the tubular member 22. A snap ring 59 limits axial movement of the rod 58. The rod 58 extends axially into the tubular member 22 as shown and is preferably provided with a reduced end portion 60. The end portion 60 is threaded to carry a nut 62.

Annular flanged members 64 and 66 are carried on the reduced end portion 60 and a substantially cylindrical filter element 68 is sandwiched between the flanged members 64 and 66. It is apparent that tightening the nut 62 securely clamps the flanged member 64, the filter element 68 and the flanged member 66 against the radially extending shoulder formed by the reduced end portion 60 of the rod 58. The flanged member 66 extends radially outwardly to be closely adjacent the inner wall of the tubular member 22 and a seal ring 70 is carried by the flanged member 66 to substantially prevent fluid leakage between the tubular member 22 and the flanged member 66. Annularly spaced openings 72 in the flanged member 66 provide communication between the interior of the filter element 68 and the outlet chamber 54. A spring 74 is biased between the housing structure 46 and the flanged member 66 to urge the flanged members 64 and 66, the filter element 68 and the rod 58 axially inwardly into the tubular member 22. The snap ring 59 limits the axial movement produced by the spring 74.

The flanged member 64 is provided with a plurality of annularly spaced perforations 76 which provide communication between the inlet end 42 of the tubular member 22 and the interior of the filter element 68. An annular valve plate 78 is axially slidably carried on the rod 58 and a spring 80 biased between the flanged member 66 and the valve plate 78 urges the valve plate 78 toward a position closing the openings 76.

As can best be seen in FIGS. 1 and 2, a shaft 80 is rotatably carried in the housing structure 46. A pointer element 82 located on the exterior surface of the housing structure 46 and secured to the shaft 80 to rotate therewith points to indicia 84 provided on an indicator plate 86. An actuator element 88 is carried on the interior end of the shaft 80 in a position substantially coaxial therewith an extends through a rectangularly slotted free end of an arm member 90. The arm member 90 is secured to the rod 58 by a pin 93 and extends substantially laterally therefrom as thown. The actuator element 88 preferably comprises an elongated strip having a substantially uniform twist about its longitudinal axis from end to end. It is apparent then that axial movement of the rod 58 will cause the slotted arm 90 to engage the actuator element 88 and produce a rotation of the shaft 80 and the pointer element 82.

The housing structure 46 is provided with an outlet 92. A rigid conduit 94 connects an intake of the pump 14 to the outlet 92. A coupling 96 is secured to a flanged portion 98 of the housing structure 46 by bolts 100 so that the conduit 94 provides the support for the housing structure 46.

It is apparent that fluid is pumped by the pump 14 through inlet end 42 of the tubular member 22, through the filter element 68, the openings 72 and out the outlet 92. As the filter element 68 becomes clogged, the pressure differential across the filter element 68 and also across the flanged member 66 will increase. This increased pressure differential will produce an axial movement of the rod 58 against the force of the spring 74 to produce a corresponding rotation of the pointer element 80 through the arm 90 and the actuator element 88. The pointer element 80 then will assume a position which when considered with the indicia 84 will accurately indicate the condition of the filter element 68.

The axial movement of the rod 58 against the force of the spring 74 is limited by a stop 104 provided on the shaft 80 which engages with the arm 90. The spring 80 is preferably somewhat stronger than the spring 74 so that when the rod 58 reaches its limited position, a further increase in pressure differential across the filter element caused by increased clogging will cause the valve plate 78 to move axially on the rod 58 against the force of the spring 80 to open the openings 76. This will provide a direct fluid path from the inlet end of the tubular member 22 to the outlet 92 bypassing the filter element 68. The valve plate 78 will open before the pressure differential has increased to a value which would produce the danger of rupturing of the filter element 68.

As can be seen in FIG. 1, the upper lateral walls of the housing structure 46 defining the outlet chamber 54 have been sloped upwardly toward the outlet 92 so as to reduce the entrapment of air within the filter device.

It is apparent from the foregoing description that a filter device has been disclosed in which the housing heretofore used has been substantially replaced by a relatively inexpensive tubing member 22. The tubing member 22 is supported by the plate 16 independently of the rest of the filter device which is supported by the conduit 94. This permits the tubular member to be constructed of relatively inexpensive and light material since it performs no supporting function. In addition, this arrangement facilitates assembly and disassembly of the system since after the housing structure 46 has been fixed in the desired position, the tubular member is simply brought up to engage the housing structure and then is clamped in position by tightening the bolt 38.

It is also apparent that the tubular member may be of any desired length and that the particular construction described permits any length or number of filter elements to be carried on an extended rod similar to rod 58. Thus the filter device of the present invention can be readily modified to provide a multiple filter device with a proper valving arrangement. Such a multiple filter device would function to direct fluid through one filter at a time with a coarser filter element being opened to fluid flow as a finer filter element becomes clogged.

When it is desired to change the filter element 68, the bolts 100 are removed and the whole assembly is simply lifted from the tubular member 22.

Figure 7:
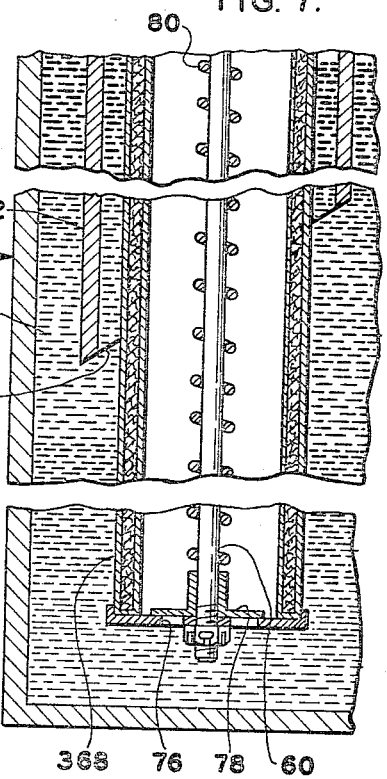
FIG. 7 is a fragmentary cross-sectional view of yet another embodiment of the invention.
Figure 6:
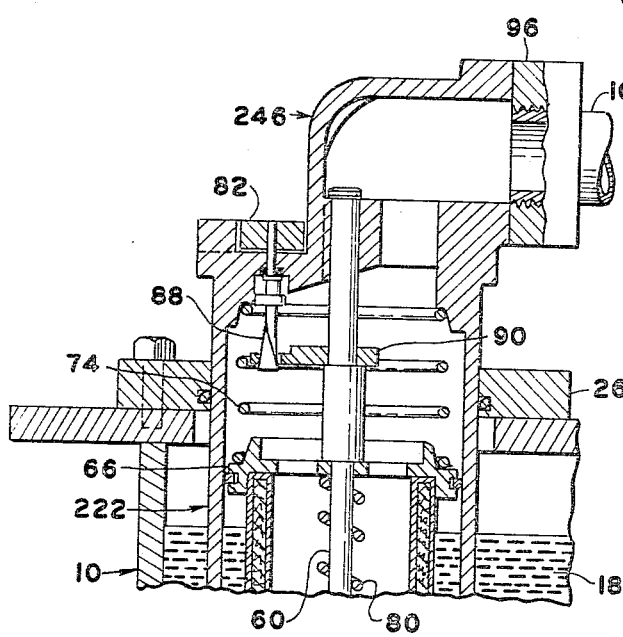
FIG. 6 is a fragmentary cross-sectional view of still another embodiment of the invention.

FIGS. 5, 6 and 7 illustrate other embodiments of the invention in which most elements are the same as in FIG. 1 with the following exceptions:

In FIG. 5, the tube 123 and housing 146 are secured together by means of a threaded connection as at 102, so that the housing 146, after being disconnected from the pump 14, may be detached from the tube 122 and removed along with the filter assembly components, or else 146 and tube 122 may be removed as a unit.

In FIG. 6, the tube 222 and housing 246 are integrally formed of a single casting and are supported and removed as a unit, the filter assembly components being removable from the bottom end of the tube 222.

In FIG. 7, it will be noted that the filter cartridge element 368 is longer and protrudes from the open inlet end of the tube 322. It will be noted that in any of the modifications, a long filter cartridge or even stacked cartridges may be used. The only requirement of proper operation is that the inlet end 42 of the tube be positioned below the level of fluid 18 in the reservoir 10.

Another preferred fluid system is illustrated in FIG. 8 as comprising a fluid reservoir 410, a filter device 412 and a fluid pump 414.

The fluid reservoir preferably comprises a tank structure 415 covered by a top plate 416 and is shown as being partially filled with a suitable fluid 418. An opening 420 is provided in the plate 416.

The filter device 412 preferably includes a tubular housing member 422 which extends axially through the opening 420 as shown. A preferred clamping member 424 for securing the tubular member 422 to the plate 416 is shown in perspective in FIG. 11 as preferably comprising a base plate 426 adapted to be secured to the plate 416 by bolts 428. A cylindrical clamp 430 or the like is secured to the base plate 426 preferably by welding 432, and is in axial alignment with an opening 434 provided in the base plate 426. Adjacent arm portions 436 are provided on the clamp 430 and a bolt 438 is provided through the arm portions 436. The tubular member 422 extends axially through the clamp 430 and the opening 434. The welding 432 is preferably provided at spaced portions of the juncture of the clamp 430 and the base portion 426 as indicated in FIG. 11, so that tightening the bolt 438 securely clamps the tubular member 422 in axial position. An annular seal 440 is provided in the base plate 426 to prevent fluid splash or spillage and vapor leakage past the opening 434.

The tubular member 422 is preferably positioned by the clamping member 424 such that an open inlet end 442 is disposed below the surface of the fluid 418 and an opposite open end 444 is disposed exteriorly of the reservoir 410.

A filter device 412 as can best be seen in FIGS. 8 and 10 preferably further comprises a housing structure 446 having an axially extending flange portion 448 which extends axially inwardly into the tubular member 422. A radially extending flange 450 provides seating engagement between the end 444 of the tubular member 422 and the housing structure 446. An O-ring seal 452 prevents fluid leakage along the flange portion 448.

The housing structure 446 is provided with an outlet chamber 454 and as best seen in FIGS. 8–9, a boss portion 456 extends into the outlet chamber 454. The boss portion 456 is provided with a threaded recess 457 which receives a threaded end portion 459 of a rod 458. The rod 458 extends axially into the tubular member 422 in substantial axial alignment therewith. The free end of the rod 458 is preferably reduced in section as shown to provide a shoulder 460. The free end of the rod 458 is also threaded as shown to receive a nut 462.

A substantially cylindrical filter cartridge 464 is carried in a position substantially concentric with the rod 458 by a pair of annular flanged members 466 and 468. The filter cartridge 464 is sandwiched between the flanged members 466 and 468 by a plurality of annularly spaced screws 470. An annular valve member 472 is secured to the reduced end portion of the rod 458 intermediate the shoulder 460 and the nut 462.

The valve member 472 is provided with an axially extending guide surface 474 which engages with an inner peripheral surface 476 of the flanged member 466. The surface 476 defines a port opening to the interior of the filter cartridge 464 and which is normally closed by a radially extending portion 480 of the valve member 472. A radially extending flange 482 of the valve member 472 limits axial movement of the flanged member 466. A plurality of annular spaced arcuate slots 484 are provided in the valve member 472 so that inward axial movement of the flanged member 466 will at a predetermined point, open fluid flow through the slots 484 into the interior of the filter cartridge 464.

The flanged member 468 axially slidably engages the rod 458 and extends radially outwardly to be closely adjacent the inner wall of the tubular member 422 and a seal ring 486 is carried by the flanged member 468 to substantially prevent fluid leakage between the flanged member 468 and the tubular member 422. Annularly spaced openings 488 in the flanged member 468 provide communication between the interior of the filter cartridge 464 and the outlet chamber 454. A spring 490 is biased between the housing structure 446 and the flanged member 468 to urge the flanged members 466 and 468 and the filter cartridge 464 axially on the rod to a position in which the valve member 472 closes the port defined by the surface 476 and the flanged member 466 engages the flange 482 as shown in FIG. 8.

As can best be seen in FIGS. 8 and 9, a shaft 492 is rotatably carried by the housing structure 446. A pointer element 494 is located on the exterior surface of the housing structure 446 and is secured to the shaft 492 to rotate therewith and points to indicia 496 provided on an indicator plate 498. An actuator element 500 is carried on the interior end of the shaft 492 in a position substantially coaxial therewith and extends through a rectangularly slotted laterally extending portion 502 of a longitudinally extending arm member 504. As can best be seen in FIG. 8, the arm member 504 is preferably an extension of the flanged member 468 and preferably extends on an axis substantially parallel with the axis of the rod 458. The actuator element 500 preferably comprises an elongated strip having a substantially uniform twist about its longitudinal axis from end to end. It is apparent then that axial movement of the flanged member 468 will cause the portion 502 of the arm member 504 to move axially with respect to the actuator element 500 and will engage the sides of the actuator element 500 and produce rotation of the shaft 492 and the pointer element 494.

The housing structure 446 is provided with an outlet 506 opening to the outlet chamber 454. A rigid conduit 508 connects the intake side of the pump 414 to the outlet 506. A coupling 510 is secured to a flanged portion 512 of the housing structure 446 by bolts 514 so that the conduit 508 provides the support for the housing structure 446. The housing structure 446 is also preferably provided with a transparent sight tube 516 which permits inspection of the outlet chamber 454 during operation of the filter device 412.

The pump 414 is preferably secured to the top plate 416 by bolts 518.

It is apparent that fluid is normally pumped by the pump 414 through the inlet end 442 of the tubular member through the filter cartridge 464, the openings 488 and out the outlet 506. As the filter cartridge 464 becomes clogged, the pressure differential across the filter cartridge 464 as well as across the flanged member 468 will increase. This increased pressure differential will cause the filter cartridge 464 and the flanged members 466 and 468 to move axially against the force of the spring 490 to produce a corresponding rotational movement of the pointer element 494 through the actuator element 500 and the portion 502 of the arm member 504. The pointer element 494 will then assume a position which when considered with the indicia 496 will accurately indicate the condition of the filter cartridge 464.

Before the filter cartridge 464 has become so clogged as to produce the danger of rupturing, the flanged member 466 will have moved past the slots 484 to open a bypass fluid path directly from the inlet end 442 of the tubular member 422 through the port defined by the surface 476 and the slots 484 to the interior of the filter cartridge 464.

As can best be seen in FIG. 8, it has been preferred wherever possible to construct the walls defining the outlet chamber 454 so that they slop generally upwardly toward the outlet 506. This construction minimizes the entrapment of air within the filter device.

It is apparent from the foregoing description that a filter device has been disclosed in which the housing heretofore used has been substantially replaced by a relatively inexpensive tubing member 422. The tubing member 422 and the rest of the filter device are independently supported so that the tubular member, because it serves no supporting function, can be constructed of very light-weight material. In addition, this arrangement facilitates assembly and disassembly of the system since after the housing structure has been fixed in the desired position the tubular member is simply brought up to engage the housing structure and then is clamped in place.

It is also apparent that the tubular member may be of any desired length and the particular construction described permits any length or number of filter elements to be carried on an extended rod similar to rod 458. Thus the filter device of the present invention can be readily modified to provide a multiple filter device. With a proper valving arrangement, such a multiple filter device could be readily made to function to direct fluid through one filter at a time with a coarser filter element being opened to fluid flow as a finer filter element becomes clogged.

When it is desired to change the filter cartridge 464, the bolts 514 are removed and the whole assembly is simply lifted from the tubular member 422.

FIG. 12 is similar to FIG. 8 but the tubular member 522 and housing structure 546 are integrally formed from a single casting or the like, eliminating the use of the clamp 424 of FIG. 8. The whole unit is supported as a whole from the pipe 508, and for removal, it is disconnected from the pipe 508 and lifted in its entirety from the reservoir 410. The filter cartridge 464 and associated components will be removable from the lower end of the tubular member 522.

In FIG. 13, the parts are similar to FIG. 8 but in this case the filter cartridge 564 is shown as extending out the bottom end of the tube 422, illustrating how the enclosing structure by the present invention imposes no limitation on the effective filter area that may be accommodated, the only requirement being that the lower end of the tubular member 422 be positioned below the level of fluid in the reservoir 410.

FIG. 14 is like FIG. 8 but in this case the tubular member 622 and housing structure 646 are connected by a threaded connection as at 652 so that the tubular member 622 will be supported by the housing structure 646 yet the two parts may be disconnected. Thus, after detaching the pipe, the housing structure 646 may either be unscrewed from the tubular member 622 and removed, carrying the filter components, or may be lifted to also remove the tubular member 622 from the reservoir 410.

In FIG. 15, a somewhat different structure is illustrated in which a single tubular housing member 722 is used, being provided with a collar 724 secured by screws 738 for positioning on the cover plate 416 of the reservoir (not shown). The lower open end 742 extends into the fluid (not shown), and an outlet port 706 is provided near the upper end, threaded for connection to a suitable supporting outlet pipe (not shown).

The upper end of the tubular member 722 is closed by a support structure cap 746 secured to a flange 750 by any means such as screws 751. The cap 746 has an elongated boss 756, carrying a rod 758 which extends axially into the tubular member 722 as shown.

A tubular filter cartridge 764 having a lower plate 766 and an upper member 768 is carried by the rod 758 between a shoulder 759 on the boss 756 and a nut 762 threaded to the bottom end of the rod 758.

Normally fluid enters the bottom end of the tubular member 722, passes through the cartridge 764 and axially up through openings 769 in the member 768, into the upper portion of the tubular member 722 and out the port 706.

The member 768 has a spider portion 770, and the inner surface of the tubular member 722 has an annular boss 771. A bypass valve member 772 is slidably supported in the boss 771 and on the portion 770 as shown, and is biased downwardly by a spring 790. As the cartridge 764 becomes clogged, the valve member 772 rises like a piston due to pressure differential untill it uncovers openings 773 in the spider portion 770, permitting fluid to bypass the filter cartridge 764. An indicator assembly 775, operated in the same fashion as the indicator of FIG. 8, exhibits the condition of the cartridge 764.

I claim:
1. In a fluid system having a fluid reservoir a filter device comprising,
  (a) a tubular member having an inlet end and an opposite end and means adjustably mounting said tubular member to said fluid reservoir in a position having said inlet end disposed below the level of fluid in said reservoir, said mounting means comprising a top plate provided for said reservoir, an opening in said top plate, means carried by the top plate around said opening and engaging said tubular member to axially slidably position said tubular member to extend through said top plate into said reservoir,
  (b) an outlet member connected with the opposite end of said tubular member and disposed exteriorly of said reservoir,
  (c) a filter assembly including a filter element carried in said tubular member and including means normally directing fluid flow from said reservoir through said filter element and to said outlet member, and
  (d) means securing said filter assembly to said outlet member to support said filter element within said tubular member.

2. The filter device as defined in claim 1 and in which said mounting means further comprises a clamping member carried by said tubular member engaging means and releasably clamping to said tubular member.

3. The fluid system as defined in claim 1 and in which said filter assembly further comprises
  (a) pressure responsive means operable to move said filter element axially within said tubular member in response to changes in the pressure differential across said filter element, and
  (b) indicator means disposed exteriorly of said reservoir and operably connected to said filter element to indicate the axial position of said filter element.

4. The fluid system as defined in claim 1 and in which said filter assembly further comprises pressure responsive valve means disposed intermediate said inlet of said tubular member and the outlet side of said filter element and being operable to open a bypass path directly between said inlet and said outlet member upon the pressure differential across said filter element increasing to a predetermined value.

5. The fluid system as defined in claim 1 and in which, said securing means comprises
  (a) a rod having one end axially slidably carried by said outlet member and extending axially into said tubular member,
  (b) said filter element being fixed to said rod and having an inlet side exposed to said inlet of said tubular member and an outlet side exposed to said outlet member and an outlet side exposed to said outlet member,
  (c) pressure responsive means secured to said rod and operable to axially move same in one axial direction in response to an increase in the pressure differential across said filter element, and
  (d) means resiliently resisting axial movement of said rod by said pressure responsive means.

6. The fluid system as defined in claim 5 and including indicating means carried exteriorly of said outlet member and operably connected to said filter assembly to indicate the axial position thereof whereby to indicate the clogging of said filter element.

7. The fluid system as defined in claim 1 and in which
  (a) said securing means comprises a rod having one end filed to said outlet member and extending axially into said tubular member,
  (b) said filter element being axially slidably mounted to said rod and having an inlet side exposed to said inlet of said tubular member and an outlet side exposed to said outlet member,
  (c) pressure responsive means axially slidably mounted to said rod and operable to axially move along same in response to an increase in the pressure differential across said filter element, and (d) means resiliently resisting axial movement of said pressure responsive means along said rod.

8. The fluid system as defined in claim 7 and including indicating means carried exteriorly of said outlet member and operably connected to said filter assembly to indicate the axial position thereof whereby to indicate the clogging of said filter element.

9. A filter device to be carried by a fluid reservoir, said filter device comprising
(a) a tubular member having an open inlet end and an opposite end,
(b) a support structure connected with said opposite end of said tubular member and having an outlet,
(c) a filter assembly including a filter element insertable into one end of said tubular member and means mounted to said support structure and axially slidably mounting said filter assembly within said tubular member,
(d) means carried exteriorly of said tubular member for securing said tubular member in a position with said inlet end disposed within a fluid supply and said opposite end disposed exteriorly of said fluid supply, and
(e) said last mentioned means comprising clamping means releasably and slidably engaging the exterior of said tubular member to releasably clamp said tubular member to said reservoir with said inlet end disposed within the fluid supply carried thereby.

10. The filter device as defined in claim 9 and including
(a) pressure responsive means operable to move said filter assembly axially within said tubular member in response to changes in the pressure differential across said filter element, and
(b) indicator means disposed exteriorly of said filter device and operably connected to said filter element to indicate the axial position of said filter element.

11. The filter device as defined in claim 9 and in which said filter assembly further comprises pressure responsive valve means disposed intermediate said inlet end of said tubular member and the outlet side of said filter element and being operable to open a bypass path directly between said inlet end and said outlet in said support structure upon the pressure differential across said filter element increasing to a predetermined value.

12. The filter device as defined in claim 9 and in which
(a) said mounting means comprises a rod having one end axially slidably carried by said support structure and extending axially into said tubular member,
(b) said filter element being fixed to said rod and having an inlet side exposed to said inlet end of said tubular member and an outlet side exposed to said outlet,
(c) pressure responsive means secured to said rod and operable to axially move same in one axial direction in response to an increase in the pressure differential across said filter,
(d) means resiliently resisting axial movement of said rod by said pressure responsive means.

13. The filter device as defined in claim 9 and in which
(a) said mounting means comprises a rod having one end fixed to said support structure and extending axially into said tubular member,
(b) said filter element being axially slidably mounted to said rod and having an inlet side exposed to said inlet end of said tubular member and an outlet side exposed to said outlet,
(c) pressure responsive means axially slidably mounted to said rod and operable to axially move along same in response to an increase in the pressure differential across said filter element, and
(d) means resiliently resisting axial movement of said pressure responsive means along said rod.

References Cited by the Examiner
UNITED STATES PATENTS

| | | | |
|---|---|---|---|
| 2,170,074 | 8/1939 | Hewitt | 210—444 X |
| 2,575,900 | 11/1951 | Vokes | 210—131 |
| 2,994,403 | 8/1961 | Winslow | 210—304 X |
| 3,172,850 | 3/1965 | Englesberg et al. | 210—172 |

REUBEN FRIEDMAN, *Primary Examiner.*

S. ZAHARNA, *Assistant Examiner.*